United States Patent [19]

Glatthorn

[11] Patent Number: 4,685,186

[45] Date of Patent: Aug. 11, 1987

[54] METHOD OF INSERTING A SLEEVE WITHIN A HEAT EXCHANGER TUBE

[75] Inventor: Raymond H. Glatthorn, St. Petersburg, Fla.

[73] Assignee: Westinghouse Electric Corp., Pittsburgh, Pa.

[21] Appl. No.: 578,591

[22] Filed: Feb. 10, 1984

Related U.S. Application Data

[63] Continuation of Ser. No. 392,979, Jun. 28, 1982, abandoned.

[51] Int. Cl.⁴ ............................................. B21D 53/06
[52] U.S. Cl. .............................. 29/157.4; 29/157.3 R; 29/727; 72/160
[58] Field of Search .................... 72/160, , 161, 164; 29/727, 726, 723, 400 N, 157.4, 157.3 R, 157.3 C

[56] References Cited

U.S. PATENT DOCUMENTS

| | | | |
|---|---|---|---|
| Re. 30,802 | 11/1981 | Rogers | 29/157.3 C |
| 202,027 | 4/1878 | Harvey | 72/164 |
| 962,831 | 6/1910 | Haga | 72/164 |
| 2,517,309 | 8/1950 | Heller | 72/164 |
| 3,116,781 | 1/1964 | Rugeley et al. | 72/160 |
| 3,595,277 | 7/1971 | Lefever | 72/164 |
| 3,924,316 | 12/1975 | Matlock et al. | 29/726 |
| 4,104,790 | 8/1978 | Hindrichs | 29/726 |
| 4,173,060 | 11/1979 | Massaro, Jr. et al. | 29/157.4 |
| 4,313,793 | 2/1982 | Klumb et al. | 376/260 |
| 4,329,769 | 5/1982 | Glatthorn | 29/727 |
| 4,334,418 | 6/1982 | Grandell | 72/164 |

FOREIGN PATENT DOCUMENTS

| | | | |
|---|---|---|---|
| 920340 | 11/1954 | Fed. Rep. of Germany | 72/164 |
| 1118576 | 6/1956 | France | 72/161 |
| 280083 | 11/1964 | Netherlands | 140/147 |
| 746765 | 3/1956 | United Kingdom | 72/164 |

Primary Examiner—Daniel C. Crane
Attorney, Agent, or Firm—G. H. Telfer

[57] ABSTRACT

The simultaneous straightening and insertion of tubular sleeves into damaged heat exchanger tubes is accomplished by passing a pre-bent tubular sleeve through a bending apparatus utilizing three forming rolls. One of the forming rolls can selectively be moved toward the other two to compensate for varying radii of curvature. The apparatus is equipped with a pneumatic or hydraulic cylinder capable of pulling the tubular sleeve through the bending apparatus in incremental steps. By simultaneously straightening and inserting pre-bent tubular sleeves into damaged heat exchanger tubes, the tubular sleeves can be inserted into damaged tubes which are in positions which would otherwise be impossible to be repaired by this method. This method effectively circumvents the proscription of straight tube insertions into damaged heat exchanger tubes from the quarter spherical chamber of the heat exchanger.

3 Claims, 3 Drawing Figures

METHOD OF INSERTING A SLEEVE WITHIN A HEAT EXCHANGER TUBE

This application is a continuation of application Ser. No. 392,979, filed June 28, 1982, now abandoned.

BACKGROUND AND SUMMARY OF THE INVENTION

The present invention relates generally to the repair of heat exchangers and, more particularly, to the simultaneous straightening and insertion of tubular sleeves into the heat exchanger tubes of steam generators.

Heat exchangers which utilize a plurality of tubes to separate primary and secondary fluids and to provide thermal communication therebetween occasionally develop faults in the walls of these tubes which can lead to leakage between these primary and secondary fluids. One recognized method of repairing these flaws is to insert a tubular sleeve into the damaged heat exchanger tube in the region of the flaw and then to bond the tubular sleeve to the inside cylindrical surface of the flawed tube. However, typical heat exchanger designs usually preclude a full extension of the tubular sleeve coaxially from the end of the damaged tube prior to its insertion into it. Typically, a heat exchanger has a hemispherical end portion which contains a chamber with which the heat exchanger tubes are in fluid communication. In cases where the tubular sleeve member is longer than the maximum linear dimension available within the chamber, this method of repair is essentially proscribed since a straight sleeve must be extended coaxially from a flawed tube before being inserted into it.

Since the hemispherical end portion of this type of heat exchanger is typically divided into two generally equal portions, each resultant chamber is in the shape of a quarter section of a sphere. This shape severely limits the maximum length of a straight tube that can be effectively manipulated within the quarter-sphere and subsequently inserted into the damaged one of the plurality of heat exchanger tubes which intersect one of the flat sides of the quarter spherical chamber in a perpendicular direction.

The present invention solves this sleeve insertion problem by permitting the tubular sleeve to be in a bent condition as it is manipulated within the quarter spherical chamber in order to reduce its effective maximum linear dimension. The bent tubular sleeve is then straightened as it is inserted into the heat exchanger tube that is to be repaired. The present invention, which can both bend and straighten the tubular sleeves, can be rigidly attached to the flat surface through which the heat exchanger tubes extend and through which the sleeve must be inserted.

The present invention permits various strategies to be employed during the tube repair operation. One method comprises bending the tubular sleeve into a arcuate shape outside of the heat exchanger and then inserting the arcuately shaped tubular sleeve through a manway and into the quarter spherically shaped chamber. From there, the arcuately shaped tubular sleeve can be passed through the present invention, straightened, and simultaneously inserted directly into the flawed tube. Alternatively, in cases where significantly long tubular sleeves must be inserted into the heat exchanger tube, a long straight sleeve can be passed through the manway and curved as it enters the heat exchanger chamber although this technique is not preferred when the quarter-spherical chamber is radioactive because of the amount of manual effort required within the chamber. Alternately, if its length is significantly long, the sleeve can be bent into a helical shape outside of the chamber to minimize the volume of space required to maintain it in the chamber prior to its insertion into the heat exchanger tube to be repaired and to permit its entry through the above-mentioned manway. The helically shaped sleeve can then be passed into the chamber through the manway and through the present invention, being straightened simultaneously as it is inserted into the damaged tube. When significant bending of a tubular sleeve is required, multiple passes through the present invention may be necessitated.

The present invention provides an apparatus and method of inserting tubular sleeves into damaged heat exchanger tubes that is not limited to the relative sizes of the quarter spherical shaped chamber of a heat exchanger or the length of the tubular sleeve.

DESCRIPTION OF THE PREFERRED EMBODIMENT

The present invention relates generally to an apparatus for straightening bent tubes and, more specifically, to the simultaneous straightening and insertion of tubular sleeve member into damaged heat exchanger tubes.

Figure 1:
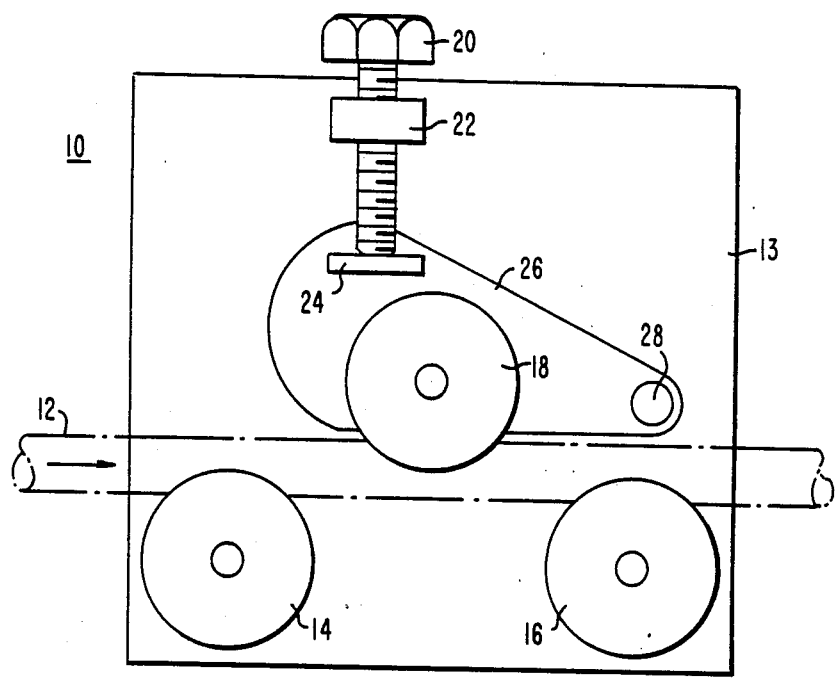
FIG. 1 shows the tube straightening portion of the present invention.

FIG. 1 shows the portion of the present invention which is used to bend a tubular sleeve to a prescribed radius of curvature. The bending apparatus 10 can either be used to straighten a previously bent sleeve 12 or to bend a straight sleeve 12 to a prescribed radius of curvature. The bending apparatus 10 comprises a frame structure which can be a generally flat rigid plate 13 as shown in FIG. 1. Rotatably connected to the structure 13 are first 14 and second 16 forming rolls. The first forming roll 14 and the second forming roll 16 have axes of rotation which are parallel to each other and lie in a plane which is generally perpendicular to the flat surface of the plate 13. Both the first 14 and second 16 forming rolls are shaped to receive the tubular sleeve 12 in rolling relation as shown in FIG. 1.

A third forming roll 18 is rotatably connected to the frame structure 13 with its axis of rotation being parallel to the axes of rotation of both the first 14 and second 16 forming rolls. The third forming roll 18 is also shaped to receive the tubular sleeve 12 in rolling relation.

The third forming roll 18 is disposed in such a way that its axis of rotation is a preselected distance from the plane in which the axes of rotation of the first 14 and second 16 forming rolls lie. This preselected distance is chosen to allow the tubular sleeve 12 to extend, as shown in FIG. 1, between the third forming roll 18 and the first 14 and second 16 forming rolls.

The present invention also comprises means for adjusting the above-mentioned preselected distance. In FIG. 1 this adjusting means comprises a threaded member 20 which passes in threaded relation with a block 22 which is rigidly connected to the plate 13. The threaded member contacts a pad 24 which rigidly connected to a rotatable member 26. A pivot 28 is provided to permit the third forming roll 18 to move toward or away from the location shown by the tubular member 12 as the rotatable member 26 rotates about the pivot 28. As the threaded member 20 is turned to provide pressure on the pad 24, the entire rotatable member 26 along with the third forming roll 18 can be forced toward the plane in which the axes of rotation of the first 14 and second 16 forming rolls lie. It should be apparent that, by rotating the threaded member 20 about its central axis, varying degrees of pressure can be exerted on the pad 24 and the third forming roll 18 and thus against the tubular sleeve 12.

By varying the position of the third forming roll 18 relative to the first 14 and second 16 forming rolls, the resultant radius of curvature of the tubular sleeve 12 can be determined. Also, it should be understood, that by inserting a previously bent tubular sleeve 12 into the bending apparatus 10 with its center of curvature extending away from the third forming roll, a previously bent tube can be altered to a preselected radius of curvature or completely straightened.

Figure 2:
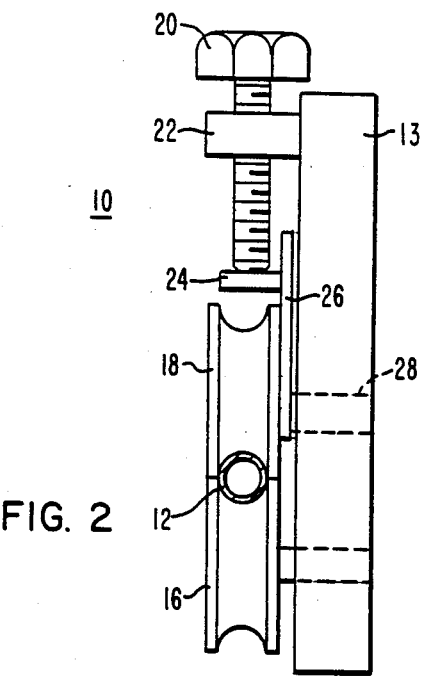
FIG. 2 shows an end view of the tube straightening portion of the present invention shown in FIG. 1.

FIG. 2 illustrates another view of the bending apparatus 10 of the present invention. It can be seen that the second forming roll 16 and the third forming roll 18 are shaped to receive the tubular sleeve 12 in rolling association. It should be understood that the view shown in FIG. 2 does not show the first forming roll (reference numeral 14 of FIG. 1) but that it, like the two forming rolls shown in FIG. 2, is also shaped to receive the tubular member 12 in rolling association.

Also shown in FIG. 2 is the pivot 28, about which the rotatable member 26 can move, along with the pad 22 which is rigidly connected to the frame member 13 and the pad 24 which is rigidly connected to the rotatable member 26. FIG. 2 also illustrates the general parallelism of the axes of rotation of the three forming rolls which are all generally perpendicular to the front surface of the plate 13. FIG. 2 also illustrates the way in which the three forming rolls are aligned to receive the tubular sleeve 12 in rolling relation therebetween.

Figure 3:
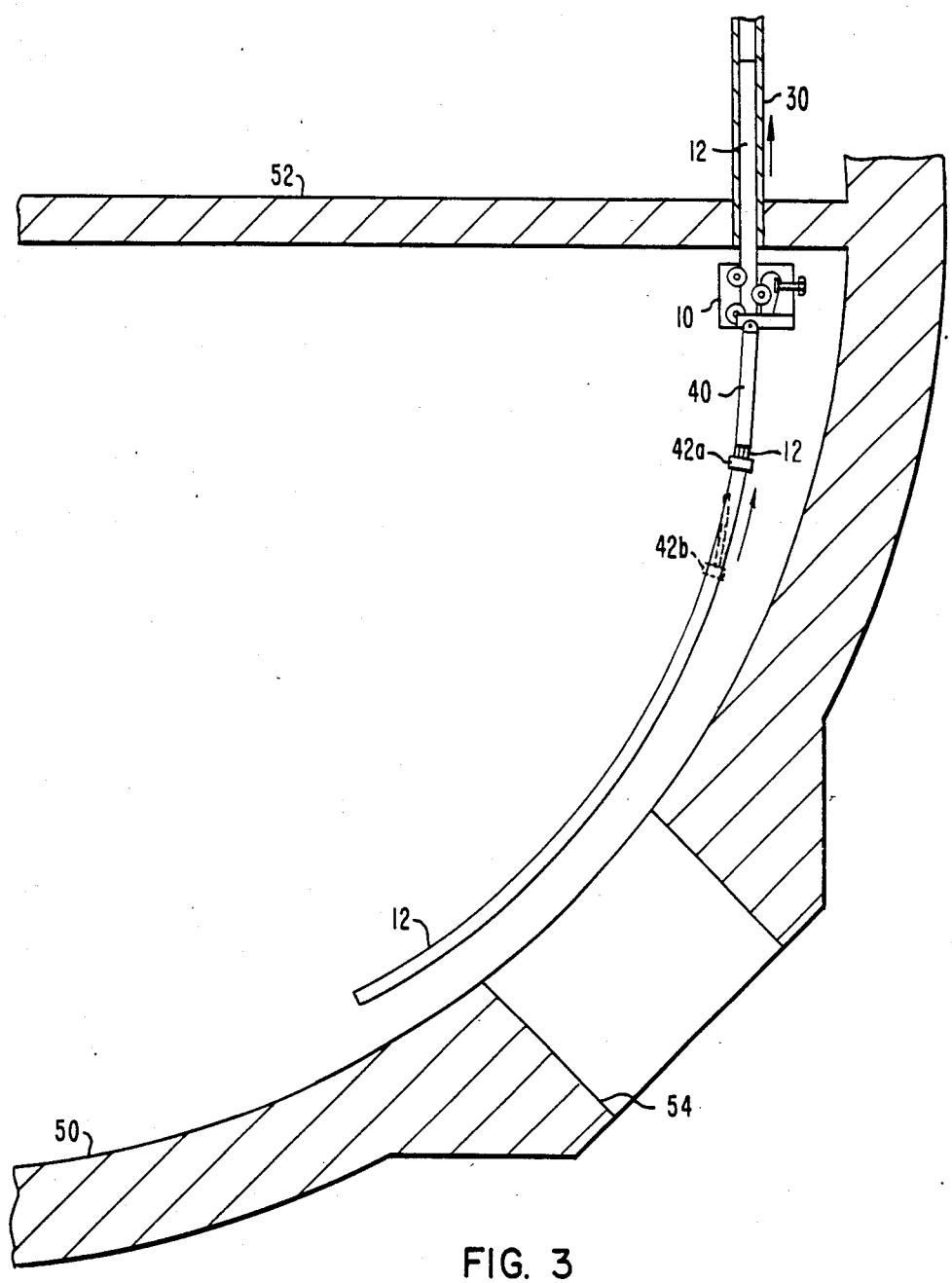
FIG. 3 shows the present invention employed to simultaneously straighten and insert a tubular sleeve into a damaged heat exchanger tube.

FIG. 3 illustrates the use of the present invention, including its tube bending portion 10, to simultaneously straighten and insert a tubular sleeve 12 into a damaged tube 30. The bending portion 10 is combined with a means 40 for causing the tubular sleeve 12 to proceed through the bending apparatus 10 and into the damaged heat exchanger tube 30. This means for causing the tubular sleeve to move in a direction of the sleeve's central axis is shown in FIG. 3 as a pneumatic or hydraulic cylinder 40. The cylinder 40 is equipped with a piston rod connected to a fixture (shown by reference numerals 42a and 42b) which can be rigidly attached to the tubular sleeve 12. This piston rod and fixture is shown in both its retracted 42a and extended 42b positions. In use, the fixture is allowed to slide freely over the tube as the piston extends it from its retracted 42a to its extended 42b position. However, prior to the piston being retracted once again, the fixture is rigidly attached to the tubular sleeve 12 and, as the cylinder 40 retracts the fixture from position 42b to its retracted position 42a, the tubular sleeve 12 is drawn with it toward the bending apparatus 10.

This alternating action of the fixture which is connected to the end of the piston rod of the cylinder 40, where it slides over the tubular sleeve 12 during the outstroke and is rigidly connected to the tubular sleeve 12 during its in stroke, can be manually controlled or can be self-regulating by the inclusion of appropriate cam actuated or ratcheted components within the end fixture itself. It should be understood that alternate means, such as power rolls or spools, can be utilized to cause the sleeve 12 to move through the bending portion 10 of the present invention.

FIG. 3 also illustrates the general configuration of the quarter spherical end portion 50 of the steam generator. One flat side 52 of the quarter spherical chamber has a plurality of holes therethrough. Each hole is in fluid communication with one of a plurality of heat exchanger tubes which act as conduits for a heated fluid as it passes through the heat exchanger. It should be apparent from FIG. 3 that the insertion of a straight tubular sleeve into the damaged heat exchanger tube 30 would be impossible due to the configuration of the quarter-spherical portion of the heat exchanger and the location of the damaged tube 30. It should equally be apparent that a bent tubular sleeve 12 easily fits within the space of the quarter spherical chamber.

It should further be understood that, when tubular sleeves 12 of significantly longer length must be used, the present invention allows an alternate procedure. From FIG. 3, it should be apparent that a straight tubular sleeve could be passed through the manway 54 and into the quarter spherical chamber 50 as it is being bent into a helical shape by the bending portion of the present invention. This bending action could continue until the entire tubular sleeve is within the chamber 50. Of course, it should be understood that the effective diameter of the helically bent tubular sleeve must be small enough to not only fit within the chamber 50, but also allow enough freedom of movement to position the end of the helically wound tubular sleeve proximate the damaged tube 30.

As discussed above, however, in a radioactive chamber, a preferred technique would be to bend the sleeve 12 into a helical shape that can be passed through the manway and into the chamber 50. Following the complete bending of the tubular sleeve, it can be simultaneously straightened and inserted into the damaged tube 30 by the bending apparatus 10 of the present invention.

Although not specifically shown in FIG. 3, it should be apparent that the present invention can be rigidly attached to a stationary member, such as the flat side 52 of the quarter spherical chamber 50 by the use of magnets or by providing the present invention with a plurality of feet which fit into adjacent holes in the flat plate 52. The method of rigidly attaching the present invention to a stationary member will vary depending upon the exact location of the damaged tube 30 and the overall shape of the chamber 50 of the heat exchanger. The choices of fixture include, but are not limited to, electromagnets, expandable cylindrical members which are insertable into adjacent tubes, or a generally rigid arm welded to a remote portion of the chamber 50.

The present invention provides an apparatus and method for repairing damaged tubes of a heat exchanger by inserting a tubular sleeve within the damaged tube. It also permits the simultaneous straightening and insertion of these tubular sleeves in geometric situations where the insertion of a straight tubular sleeve would be impossible. The present invention enables the bending and subsequent straightening of the tubular sleeves to comform to the restrictive shape of a heat exchanger.

What I claim is:

1. A method of inserting a sleeve within a damaged heat exchanger tube of a steam generator where the tube entrance is within a chamber accessed through a manway and the geometry of the tube entrance, chamber and manway prevent direct insertion of a straight sleeve into the tube, the steps comprising:

performing a required length of the sleeve to a curved configuration;

arranging a tube straightening device within the chamber of the steam generator proximate a tube to be sleeved;

passing at least a portion of the preformed sleeve through the manway into the chamber;

placing an end of the preformed sleeve within a straightening device; and passing the sleeve through the straightening device to reform the sleeve to a straight configuration and inserting the straightened sleeve into the tube.

2. A method of inserting a sleeve in accordance with claim 1 wherein:

the chamber in which the tube entrance is located has a partial spherical surface and said preforming of the sleeve curves it so it fits entirely within the chamber in one arcuate length.

3. A method of inserting a sleeve in accordance with claim 1 wherein:

the sleeve is preformed into a helical shape that fits within the chamber.

* * * * *